US011947671B2

(12) United States Patent
Putman et al.

(10) Patent No.: US 11,947,671 B2
(45) Date of Patent: *Apr. 2, 2024

(54) METHOD, SYSTEMS AND APPARATUS FOR INTELLIGENTLY EMULATING FACTORY CONTROL SYSTEMS AND SIMULATING RESPONSE DATA

(71) Applicant: Nanotronics Imaging, Inc., Cuyahoga Falls, OH (US)

(72) Inventors: John B. Putman, Celebration, FL (US); Jonathan Lee, New York, NY (US); Matthew C. Putman, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,283

(22) Filed: Jun. 5, 2023

(65) Prior Publication Data
US 2023/0315854 A1 Oct. 5, 2023

Related U.S. Application Data

(63) Continuation of application No. 17/447,767, filed on Sep. 15, 2021, now Pat. No. 11,669,617.

(51) Int. Cl.
*G06F 21/56* (2013.01)
*G06F 21/55* (2013.01)

(52) U.S. Cl.
CPC ............ *G06F 21/566* (2013.01); *G06F 21/55* (2013.01); *G06F 2221/034* (2013.01); *G06F 2221/2107* (2013.01)

(58) Field of Classification Search
CPC ... G06F 21/566; G06F 21/55; G06F 2221/034
See application file for complete search history.

(56) References Cited

U.S. PATENT DOCUMENTS

2014/0337000 A1* 11/2014 Asenjo .................. G06Q 10/06
703/13
2016/0261482 A1 9/2016 Mixer et al.
(Continued)

FOREIGN PATENT DOCUMENTS

CN 111989630 11/2020
CN 112615819 4/2021
(Continued)

OTHER PUBLICATIONS

Grznár, Patrik, et al. "Modeling and Simulation of Processes in a Factory of the Future." Applied sciences 10.13 (2020): 4503. (Year : 2020).*
(Continued)

*Primary Examiner* — Robert B Leung
(74) *Attorney, Agent, or Firm* — DLA PIPER LLP (US)

(57) ABSTRACT

A simulated process is initiated. The simulated process includes generating, by an emulator, a control signal based on external inputs. The simulated process further includes processing, by a simulator, the control signal to generate simulated response data. The simulated process further includes generating, by a deep learning processor, expected behavioral pattern data based on the simulated response data. An actual process is initiated by initializing setpoints for a process station in a manufacturing system. The actual process includes generating, by the deep learning processor, actual behavioral pattern data based on actual process data from the at least one process station. The deep learning processor compares the expected behavioral pattern to the actual behavioral pattern. Based on the comparing, the deep learning processor determines that anomalous activity is present in the manufacturing system. Based on the anomalous activity being present, the deep learning processor initiates an alert protocol.

20 Claims, 7 Drawing Sheets

(56) References Cited

U.S. PATENT DOCUMENTS

| | | | |
|---|---|---|---|
| 2016/0330225 A1 | 11/2016 | Kroyzer et al. | |
| 2017/0264629 A1* | 9/2017 | Wei | G05B 19/058 |
| 2019/0205531 A1 | 7/2019 | McMurdie et al. | |
| 2019/0302707 A1 | 10/2019 | Guo et al. | |
| 2020/0097352 A1 | 3/2020 | Mahindru et al. | |
| 2020/0183340 A1* | 6/2020 | Gasiba | H04L 63/1425 |
| 2020/0231466 A1* | 7/2020 | Lu | G01N 33/18 |
| 2022/0011760 A1 | 1/2022 | Zhou et al. | |

FOREIGN PATENT DOCUMENTS

| | | |
|---|---|---|
| CN | 113179263 | 7/2021 |
| CN | 113196311 | 7/2021 |
| CN | 113221104 | 8/2021 |
| TW | 202122946 | 6/2021 |
| WO | 2019/108919 | 6/2019 |
| WO | 2019/216975 | 11/2019 |
| WO | 2020097352 | 5/2020 |
| WO | 2021/173961 | 9/2021 |

OTHER PUBLICATIONS

Al-Abassi, Abdulrahman, et al. "An ensemble deep learning-based cyber-attack detection in industrial control system." IEEE Access 8 (2020): 83965-83973. (Year: 2020).*

Search Report for Taiwan Patent Application No. 111134918, dated Jul. 4, 2023, 16 pages.

PCT International Application No. PCT/US22/42223, International Search Report and Written Opinion of the International Searching Authority, dated Jan. 9, 2023, 8 pages.

Pliatsios, et al., "A novel and interactive industrial control system honeypot for critical smart grid infrastructure," 2019 IEEE 24th International Workshop on Computer Aided Modeling and Design of Communication Links and Networks (CAMAD), IEEE, 2019.

López-Morales, et al., "Honeyplc: A next-generation honeypot for industrial control systems," Proceedings of the 2020 ACM SIGSAC Conference on Computer and Communications Security, 2020, pp. 279-291.

* cited by examiner

METHOD, SYSTEMS AND APPARATUS FOR INTELLIGENTLY EMULATING FACTORY CONTROL SYSTEMS AND SIMULATING RESPONSE DATA

CROSS-REFERENCE TO RELATED APPLICATION

This is a continuation of U.S. application Ser. No. 17/447,767, filed Sep. 15, 2021, which is incorporated by reference in its entirety.

FIELD OF THE DISCLOSURE

The present disclosure generally relates to systems, apparatuses and methods for intelligently emulating factory control systems and simulating response data to successfully attract malware attacks that target factories and to analyze their behavior.

BACKGROUND

Malware attacks against factories are proliferating and becoming very sophisticated. Further, these malware attacks are often capable of penetrating isolated and closed computer networks, as well as machines connected to external networks (e.g., 4G and 5G networks). Many of these attacks often target factory control systems that control the operation of a factory's physical equipment and processes. Malware, as used herein, refers to any hardware or software that causes damage, disruption, or unauthorized access or manipulation, for example, to a computer, server, controller, computer network, computer-controlled equipment, data, or the quality or yield of a final output. Malware can include computer viruses, worms, Trojan horses, spyware, backdoors, or generally any program or file that can be harmful to a computer system. Malware can be designed to target a factory's control systems and cause subtle changes to the operation of the factory's physical equipment and processes that are often able to evade conventional information technology (IT) security solutions or conventional process control systems.

SUMMARY

In some embodiments, a method is disclosed herein. A simulated process is initiated. The simulated process includes generating, by an emulator, a control signal based on external inputs. The simulated process further includes processing, by a simulator, the control signal to generate simulated response data. The simulated process further includes generating, by a deep learning processor, expected behavioral pattern data based on the simulated response data. An actual process is initiated by initializing setpoints for a process station in a manufacturing system. The actual process includes generating, by the deep learning processor, actual behavioral pattern data based on actual process data from the at least one process station. The deep learning processor compares the expected behavioral pattern to the actual behavioral pattern. Based on the comparing, the deep learning processor determines that anomalous activity is present in the manufacturing system. Based on the anomalous activity being present, the deep learning processor initiates an alert protocol.

In some embodiments, a system is disclosed herein. The system includes an emulator, a simulator, a deep learning processor, and a data processing server. The emulator, simulator, deep learning processor, and data processing server are configured to perform operations. The operations include initiating a simulated process. The simulated process includes generating, by an emulator, a control signal based on external inputs. The simulated process further includes processing, by a simulator, the control signal to generate simulated response data. The simulated process further includes generating, by a deep learning processor, expected behavioral pattern data based on the simulated response data. The operations further include initiating an actual process by initializing setpoints for a process station in a manufacturing system. The actual process includes generating, actual behavioral pattern data based on actual process data from the at least one process station. The operations further include comparing, by the deep learning processor, the expected behavioral pattern to the actual behavioral pattern. The operations further include, based on the comparing, determining, by the deep learning processor, that anomalous activity is present in the manufacturing system. The operations further include, based on the anomalous activity being present, initiating, by the deep learning processor, an alert protocol.

In some embodiments, a non-transitory computer readable medium is disclosed herein. The non-transitory computer readable medium includes one or more sequences of instructions, which, when executed by a processor, causes a computing system to perform operations. The operations include initiating a simulated process. The simulated process includes generating, by an emulator, a control signal based on external inputs. The simulated process further includes processing, by a simulator, the control signal to generate simulated response data. The simulated process further includes generating, by a deep learning processor, expected behavioral pattern data based on the simulated response data. The operations further include initiating an actual process by initializing setpoints for a process station in a manufacturing system. The actual process includes generating actual behavioral pattern data based on actual process data from the at least one process station. The operations further include comparing, by the deep learning processor, the expected behavioral pattern to the actual behavioral pattern. The operations further include based on the comparing, determining, by the deep learning processor, that anomalous activity is present in the manufacturing system. The operations further include, based on the anomalous activity being present, initiating, by the deep learning processor, an alert protocol.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein are generally directed to a system and method for intelligently emulating factory control systems and simulating response data to successfully attract malware attacks that target factories and to analyze their behavior. Such approach includes two subprocess: a simulated process and an actual process. Outputs from the simulated process and the actual process may be compared to determine whether anomalous activity or malicious activity is present.

Figure 1:
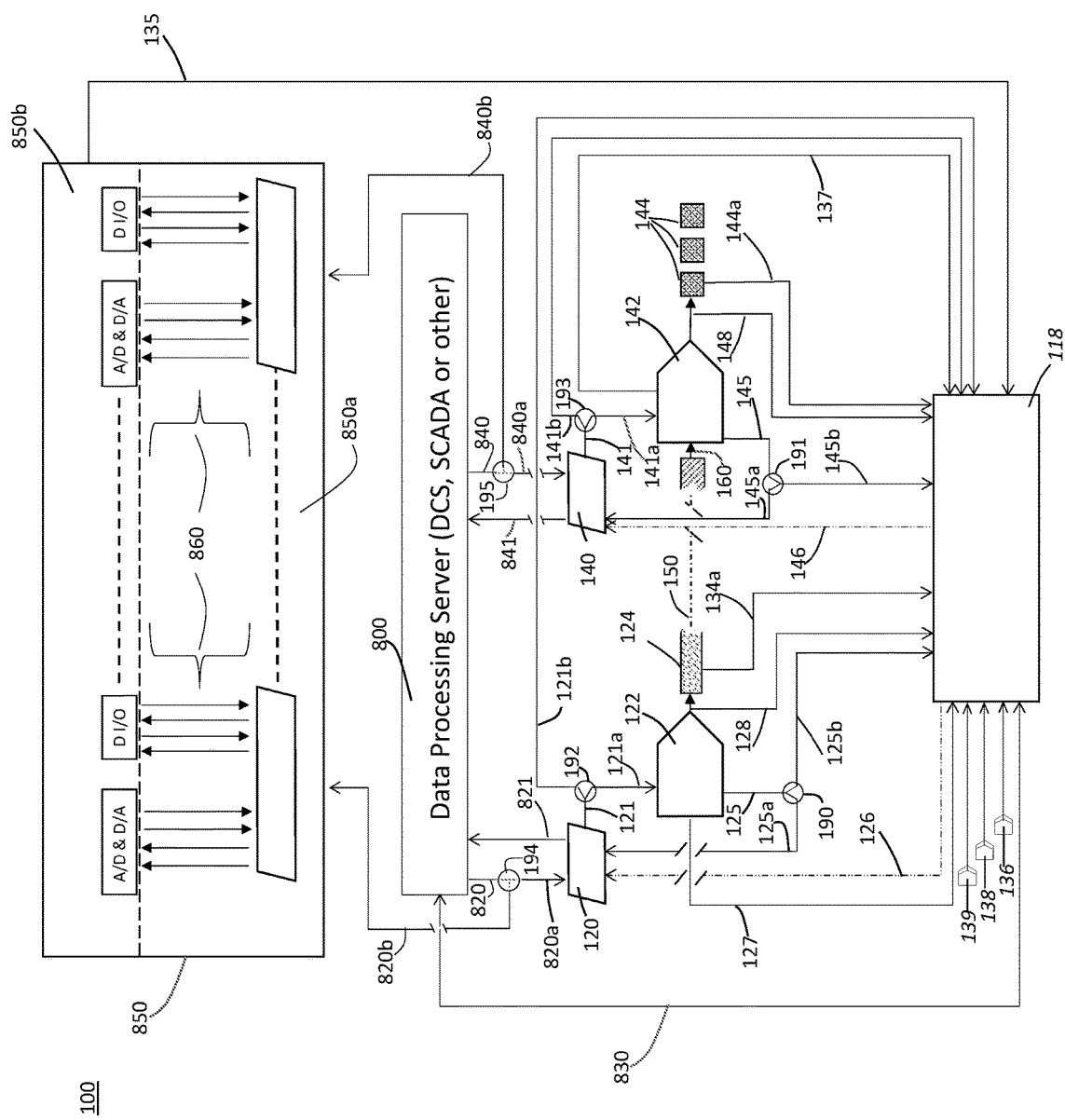
FIG. 1 is a block diagram illustrating a manufacturing system 100, according to example embodiments.

FIG. 1 is a block diagram illustrating a manufacturing system 100, according to example embodiments. As shown, manufacturing system 100 may include station controller 120, process station 122, station controller 140, process station 142, deep learning processor 118, data processing server 800, and process simulator 850. Although two process stations 122, 142 are shown, those skilled in the art understand that any number (e.g., N) of process stations configured to carry out a manufacturing process may be used. Generally, process stations 122, 142 can operate serially or in parallel.

Process station 122 may be configured to perform a step of a manufacturing process. Process station 122 may be associated with station controller 120. Station controller 120 may be configured to manage setpoints, algorithms, initial input and operating instructions, system and process updates, and other control inputs for process station 122.

Process station 142 may be configured to perform a step of a manufacturing process. For example, process station 142 may be configured to perform a downstream process step from process station 122. Process station 142 may be associated with station controller 140. Station controller 140 may be configured to manage setpoints, algorithms, initial input and operating instructions, system and process updates, and other control inputs for process station 142.

Data processing server 800 may be representative of one or more computers on a network. Data processing server 800 may be configured to receive data (e.g., 821, 841) output by station controllers 120 and 140, as well as data generated by sensors coupled to or within process stations 122 or 142 or from independent sensors 127 and 137. Data output, includes, but is not limited to: (i) data generated during the manufacturing process (e.g., data logs coupled to physical sensors, process station components, or station controller components); (ii) data received by or transmitted from each process station or station controller and (iii) data communications and data generation patterns of individual or any number of process stations or station controllers (e.g., high data volumes, low data volumes, erratic data volumes, unusual data communication or data generation based on time of day, origin or destination of the data). In further embodiments, data processing server 800 can receive all response data.

As shown, manufacturing system 100 may include a splitter 194 configured to split an output signal 820 from data processing server 800. For example, data processing server 800 may be configured to provide setpoints, algorithms, initial input and operation instructions, system and process updates, and other control inputs to station controller 120 (shown as output signal 820). Splitter 194 may receive output signal 820 prior to output signal reaching process station 122. Splitter 194 may split output signal 820 into a first portion 820a and a second portion 820b. First portion 820a of output signal 820 may be provided to process station 122. Second portion 820b of output signal 820 may be provided to simulator 850.

Manufacturing system 100 may further include a splitter 195 configured to split an output signal 840 from data processing server 800. For example, data processing server 800 may be configured to provide setpoints, algorithms, initial input and operation instructions, system and process updates, and other control inputs to station controller 140 (shown as output signal 840). Splitter 195 may receive output signal 840 prior to output signal reaching process station 142. Splitter 195 may split output signal 840 into a first portion 840a and a second portion 840b. First portion 840a of output signal 840 may be provided to process station 142. Second portion 840b of output signal 840 may be provided to simulator 850.

In some embodiments, the data output can be provided to deep learning processor 118. In some embodiments, in order to isolate deep learning processor 118, data processing server may not provide any inputs to deep learning processor 118. In some embodiments, data processing server 800 can also receive data from related manufacturing processes occurring in remote geographic locations and provide such data to deep learning processor 118. In further embodiments, data that a factory collects to perform analysis, as well as analysis data, such as in a control room, can be collected by data processing server 800. Not all data inputs to data processing server 800 are shown in FIG. 1.

Universal inputs 136, experiential priors 139, functional priors 138, and values from each of the N stations (e.g., 122 and 142) can be provided to deep learning processor 118. In some embodiments, any number of additional deep learning processors can be used and configured to train deep learning processor 118 and the process simulator. In some embodiments, universal inputs 136, experiential priors 139, functional priors 138 can include spatial scans of the process controllers and other components of the factory's P/E/C system. The spatial scans can provide a source of product identification numbers and other information found on the circuit board and can be combined or cross referenced with the information from board logs (bios).

Functional priors, as used herein, may refer to information relating to the functionality and known limitations of each process station, individually and collectively, in a manufacturing process. The specifications for the equipment used at the process station, as well as all product models and identifying information, are all considered functional priors. Example functional priors can include, but are not limited to: a screw driven extruder that has a minimum and maximum speed that the screw can rotate; a temperature control system that has a maximum and minimum temperature achievable based on its heating and cooling capabilities; a pressure vessel that has a maximum pressure that it will contain before it explodes; a combustible liquid that has a maximum temperature that can be reached before combustion. Functional priors can also include an order in which the individual stations that are part of a manufacturing process perform their functions. Further, functional priors can include normal process variations and normal process noise. Normal process variations can include machine tolerances (e.g., temperature control variations +/−1 deg C., conveyor speed variations +/−0.1 m/min, pressure variations +/−3 kPa); raw material variations, variations in cooling water temperature, variations due to operator error and normal process noise can include, for example, jitter in electrical signals and rounding errors in data collection and recording.

Experiential priors as used herein, may refer to information gained by prior experience with, for example performing the same or similar manufacturing process; operating the same or similar stations; producing the same or similar intermediate/final outputs; root cause analysis for defects or failures in final outputs for the manufacturing process and solutions. Experiential priors can also include log data from all of a factory's systems, as well as data collected by data processing server 800.

Universal inputs, as used herein, may refer to a value that is not specific to a particular process station, but rather to an aspect of the entire manufacturing process, for example, a date, time of day, ambient temperature, humidity or other environmental conditions that might impact the manufacturing process, operator, level of skill of the operator and likelihood of error, raw materials used in the process, raw material specifications such as color, viscosity, particle size, among other characteristics that are specific to the raw material, specific lot numbers and cost of raw materials, tenure of the equipment/tools for each station, identifying information such as production work order numbers, batch numbers, lot numbers, finished product numbers and finished product serial numbers.

Note, that the examples provided for each of functional priors, experiential priors and universal inputs represent one way to classify these examples, other suitable classifications can be used. For example, another way to classify the input that is provided to deep learning processor 118 may be: pre-process inputs (e.g., experiential priors, functional priors, material properties, scheduling requirements); in-process inputs (e.g., universal inputs, control values, station values, intermediate values, final output values, process values); post-process inputs (e.g., manufacturing performance metrics and other analytics). Further, the functional and experiential priors can be dynamically updated throughout the manufacturing process.

Each process station can be controlled by one or more associated station controllers (e.g., station controller 120 controls process station 122 and station controller 140 controls process station 142). In an embodiment, a single station controller can control multiple process stations or control multiple control values associated with a single process station. In some embodiments, deep learning processor 118 can provide control inputs (represented by 126 and 146) based on predictive process control or pre-programmed algorithms to each process station controller. Predictive process control is described in U.S. patent application Ser. No. 16/663,245 entitled "Predictive Process Control for a Manufacturing Process," and U.S. patent application Ser. No. 16/900,124 entitled "Method, Systems and Apparatus For Intelligently Emulating Factory Control Systems and Simulating Response Data," which are hereby incorporated by reference herein in their entireties. In other embodiments, the deep learning processor does not provide any inputs to the station controller.

A signal conditioner 190, 191, 192 and 193, for example a signal splitter, amplifier, digital to analog converter, analog to digital converter, TTL, can be included to divide the control signals (e.g., 121 is divided into 121a and 121b and 141 is divided into 141a and 141b) and the control values (e.g., 125 is divided into 125a and 125b and 145 is divided into 145a and 145b) so that the control signals and the control values are sent both to deep learning processor 118 and the relevant station controller (e.g., 120 or 140). The control values can be analog or digital signals. Further, a signal conditioner, according to some embodiments, can be included within deep learning processor and can convert all analog values to digital values or perform other conditioning. Each station controller can provide one or more control signals (e.g., 121 and 141) that provides commands for regulating a station's control values (e.g., control values 125 and 145). Each station outputs an intermediate output (e.g., 124 and 144), that has an intermediate output value (134a and 144a respectively). All intermediate output values and the final output value (e.g., 144, if process station 142 is the final process station in the process) from the processing stations are provided to deep learning processor 118. Each station also outputs station values (e.g., 128 and 148) that can be provided to deep learning processor 118. FIG. 1 also illustrates that intermediate output 124 is sent (step 150) to one or more subsequent stations, which can represent a single station or any number of multiple stations. Station 142, as shown in FIG. 1, can receive (step 160) an intermediate input from any number of prior stations. In some embodiments, the setpoint values used by the station controllers (e.g., controllers 120 and 140) can be sent to deep learning processor 118. Further, values relating to the manufacturing process can be measured by independent sensors (e.g., independent sensor 127 and 137) and provided to deep learning processor 118.

Process simulator 850 may be configured to initiate a simulated process. For example, process simulator 850 may receive second portion 820b of control signal 820 from data processing server 800 via splitter 194. Similarly, process simulator 850 may receive second portion 840b of control signal 840 from data processing server 800 via splitter 195. Based on second portion 820b of control signal 820 and/or second portion 840b of control signal 840, process simulator 850 may initiate a simulated process.

Process simulator 850 may include an emulator 850a and a simulator 850b. Emulator 850a may be configured to generate or emulate control signals similar to those control signals that are generated by a process controller (e.g., process controller 120, 140) during operation. Emulator 850a may communicate with simulator 850b via communications 860. Via communications 860, emulator 850a may provide the emulated control signal to simulator 850b. Generally, any inputs provided to process controllers 120, 140 may also be provided to process simulator 850.

Simulator 850b may be configured to simulate the manufacturing process based on control signals generated by emulator 850a. For example, simulator 850b may generate simulated response data based on the emulated control signals. In some embodiments, simulator 850b may provide the simulated response data to emulator 850a, via communications 860, so that emulator 850a can generated updated emulated control signals based on the simulated response data. In some embodiments, simulator 850b may provide the simulated response data (e.g., output 135) to deep learning processor 118 for further analysis.

It is understood that the communication among deep learning processor 118, station controllers 120, 140, process stations 122, 142, data processing server 800, and process simulator 850, can use any suitable communication technologies that provide the ability to communicate with one or more other devices, and/or to transact data with a computer network. By way of example, implemented communication technologies can include, but are not limited to: analog technologies (e.g., relay logic), digital technologies (e.g., RS232, ethernet, or wireless), network technologies e.g., local area network (LAN), a wide area network (WAN), the Internet, Bluetooth technologies, Nearfield communication technologies, Secure RF technologies, and/or any other suitable communication technologies. In some embodiments, in order to isolate deep learning processor 118 from being infected by any malware, deep learning processor 118 may not receive any input from any process controller, data processing server 800, or from any computer connected to a network. In some embodiments, inputs from process controllers or data processing server 800 can be input into deep learning processor 118 manually or input via a memory device (e.g., a thumb drive) after the memory device has been scrubbed for any malware.

In some embodiments, operator inputs can be communicated to deep learning processor 118, and/or any of the station controllers or process stations using any suitable input device (e.g., keyboard, mouse, joystick, touch, touchscreen, etc.).

Figure 2:
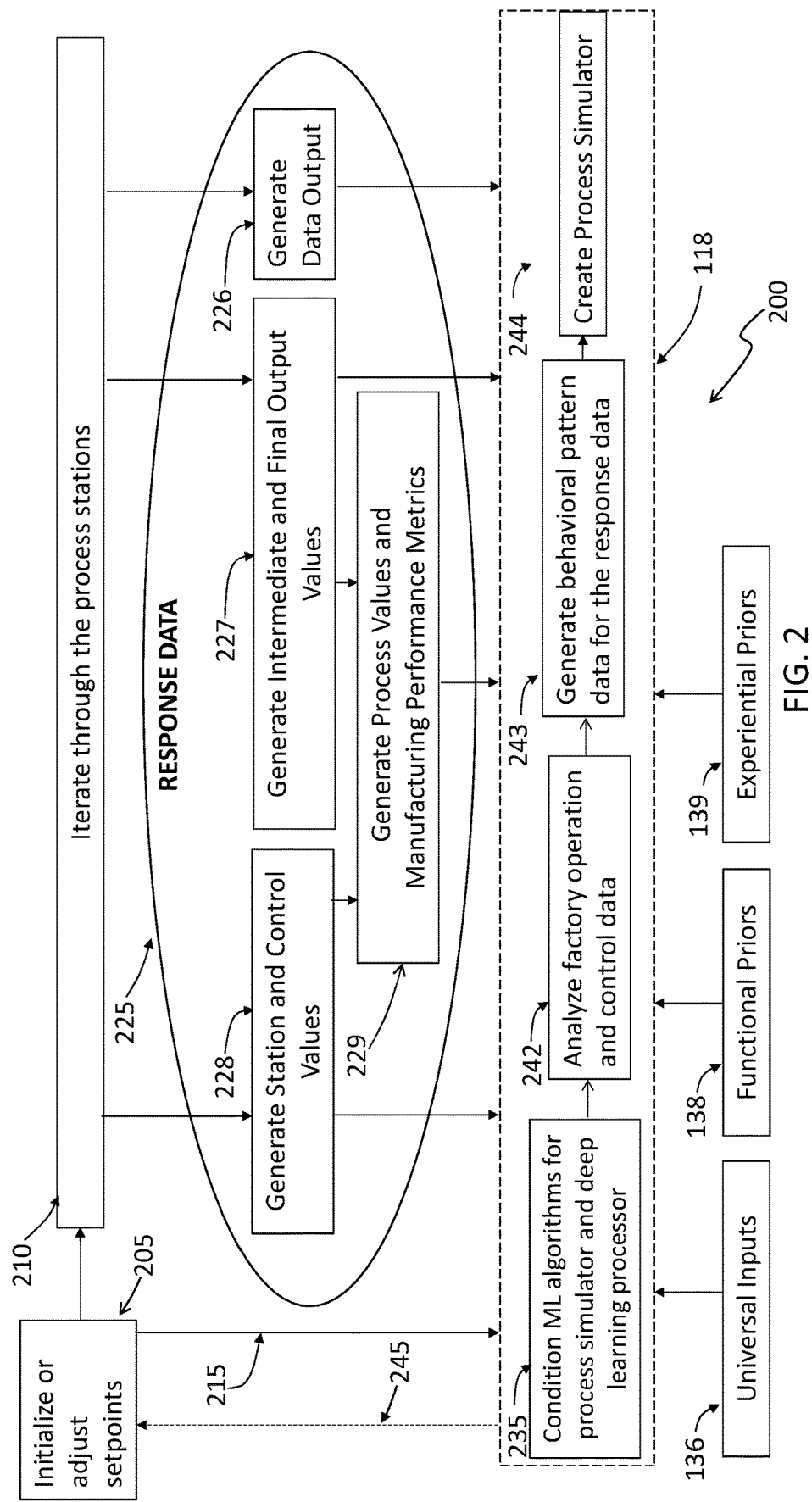
FIG. 2, according to some embodiments of the disclosed subject matter, provides a method 200 for conditioning machine learning models and creating a process simulator, according to example embodiments

FIG. 2, according to some embodiments of the disclosed subject matter, provides a method 200 for conditioning (training) machine learning models and creating a process simulator 850, according to example embodiments. The method 200 may be performed by a control system or other computing system that may provide hardware and/or software configured to implement the deep learning processor 118. In some embodiments, a similar method can be employed for a particular machine or process in a factory.

In step 205, the setpoints, algorithms and other control inputs for each station controller in a manufacturing process can be initialized using conventional control methods. Further, the control algorithms/operator can provide initial control or station values. The control algorithms, initial setpoint values, and initial control or station values can be provided to deep learning processor 118 (step 215). In other embodiments, the setpoints, algorithms and other control inputs for each station controller in a manufacturing process can be provided to the station controller using predictive process control (step 245), as described in U.S. patent application Ser. No. 16/663,245 "Predictive Process Control for a Manufacturing Process." It should be noted that control values, control algorithms, setpoints and any other information (e.g., process timing, equipment instructions, alarm alerts, emergency stops) provided to a station controller may be referred to collectively as "station controller inputs" or "control inputs." Further, other inputs, like functional priors 138, experiential priors 139 and universal inputs 136 can be provided to deep learning processor 118.

In step 210, the manufacturing process iterates through all the process stations for a predetermined time period, and or based upon another suitable condition (e.g., creation of a robust data set), using conventional or predictive process control methods. The process stations discussed herein can operate in series or in parallel. Further, a single station can perform: a single process step multiple times (sequentially or non-sequentially), or different process steps (sequentially or non-sequentially) for a single iteration of a manufacturing process. The process stations generate intermediate outputs, or a final output if it is a final station. The intermediate output is transmitted to subsequent (downstream) station(s) in the manufacturing process until a final output is generated. In further embodiments, the manufacturing of components for a final output can be asynchronous and geographically disperse. In other words, components for a final output can be manufactured at any time or any place, not necessarily at a time or place proximate to assembling the components into a final output. For example, the headlights of a car can be manufactured months before a car with the headlights is assembled.

As the process iterates through each station, all the values associated with: an individual station (e.g., control values); an output of an individual station (e.g., station values, intermediate/final output values, data output), or multiple stations (e.g., process values) are measured or calculated and provided to deep learning processor 118 (steps 226, 227, 228, 229) to condition its machine learning models. In some embodiments, manufacturing performance metrics (e.g., production volume for a specified time period, production downtime for a specified time period, resources used for a specified time period or a specified number of final outputs, percentage of products not in specification for a specified time period, production volume for a particular operator, material costs associated with a specified number of final outputs) for the manufacturing process under conventional control can be calculated and provided to deep learning processor 118 (step 229).

Although not shown, any actions taken (or control signals generated) by the station controller in response to a received control value or other control input from a process station can be provided to deep learning processor 118. Such actions can include adjusting temperature, speed, etc.

Note all inputs to deep learning processor 118 can be entered electronically or via manual means by an operator. Further, the inputs can be provided directly, or indirectly via a memory device, so that the memory device can be scrubbed for any malware, before the data is provided to the deep learning processor.

The conditioning of deep learning processor 118's machine learning models (e.g., step 242) can be achieved through unsupervised learning methods. Other than functional priors 138, experiential priors 139, universal inputs 136 that are input into deep learning processor 118, deep learning processor 118 draws inferences simply by analyzing the received data that it collects during the iteration of the manufacturing process (e.g., steps 226, 227, 228 and 229). In other embodiments, the conditioning of the machine learning models (step 242) can be conditioned via supervised learning methods, or a combination of supervised and unsupervised methods or similar machine learning methods. Further, the conditioning of the machine learning models can be augmented by: providing deep learning processor 118 with simulated data or data from a similar manufacturing process. In one embodiment, the machine learning models can be conditioned by implementing deep learning processor 118 into a similar manufacturing process and fine-tuning the deep learning processor during implementation in the target manufacturing process. That is, training of deep learning processor 118 can be performed using a training process that is performed before deep learning processor 118 is deployed into a target manufacturing environment.

As shown in FIG. 2, deep learning processor 118 employs machine learning (ML) models (step 235). These machine learning models can be conditioned by analyzing factory operation and control data (step 242) and generating behavioral pattern data (step 243) for the response data generated as the manufacturing process iterates through the process stations.

The factory operation and control data (step 242) can include the following: (i) the particular control value that corresponds to the setpoint; (ii) the other control values (and their corresponding setpoints) generated by the identified process station; (iii) the station values generated by the identified processing station; (iv) the intermediate output values generated by the identified processing station; (v) the control values (and their corresponding setpoints), station values, intermediate and final outputs generated by other process stations; (vi) universal inputs, functional priors, experiential priors; (vii) the control signals and other instructions provided to each processing station; (viii) the control inputs provided to each station controller; (ix) data output; (x) measured values relating to factory control and operation received from independent sensors. Independent sensors can refer to sensors that provide measurements, beyond the sensors included in the normal manufacturing process. Since independent sensors are not part of the normal manufacturing process, they are often protected from malware penetration. In some embodiments, these independent sensors are not directly tied to a single machine or process step and can be fluidly used to measure values from any machine or process step (e.g., a handheld device that randomly takes measurements during the manufacturing process). In some embodiments, independent sensors can provide its outputted values to a coupled monitor, in addition to, or instead of, a deep learning processor 118. Values provided exclusively to a monitor, can be input manually into deep learning processor 118, according to some embodiments.

Generating behavioral patterns (step 243) for the response data, for a single station and across stations, for a single point in time or over a period of time, can include identifying: positive correlations; negative correlations; frequency; amplitude; upward or downward trends; a rate of change for each control value or station value; for an identified response data, other response data that will or will not be affected if the identified response data changes. Response data 225 includes not only the control value associated with a particular set point for an identified process stations, but one or more of the following data types: (i) control values associated with other set points for the identified process station; (ii) station values associated with the identified process station; (iii) intermediate output values associated with the identified process station; (iv) control values associated with other process stations; (v) station values associated with other process stations; (vi) intermediate output values associated with other process station; (vii) final output value; (viii) data output; (ix) measured values relating to factory control and operation received from independent sensors.

Note, data is usually collected from sensors at a predefined rate. The frequency analysis can take into account this rate and adjust its output value accordingly, so that the output value reflects the true frequency rate, and does not reflect a rate that includes the time it takes to collect data from the sensors. In some embodiments, the frequency analysis can also show rapid changes in a control value after a rise or fall and a brief stabilization period. The stabilization period can be so brief that it is barely detectable. This can be an example of an attack. Instead of a control value stabilizing at a high or at a low point, a malicious signal can be provided to keep increasing or decreasing the control value beyond an acceptable high or low. By increasing or decreasing shortly after stabilization, the attack can seem normal and consistent with the control value's prior increase or decrease.

Based on analyzing: factory operation and control data (step 242), generated behavioral pattern data (step 243), and other inputs to the deep learning processor, deep learning processor 118 can determine normal process variations and normal process noise to further condition its machine learning models. Normal process variations can include machine tolerances (e.g., temperature control variations +/−1 deg C., conveyor speed variations +/−0.1 m/min, pressure variations +/−3 kPa); raw material variations, variations in cooling water temperature, variations due to operator error and normal process noise can include, for example, jitter in electrical signals and rounding errors in data collection and recording.

To create a robust data set for the conditioning of the machine learning models, setpoints (or other control inputs) corresponding to each control value of each process station can be adjusted, in a systematic manner (e.g., from a minimum value to a maximum value), for every value (or a subset of values) that will yield in-specification final outputs. In further embodiments, setpoints (or other control inputs), corresponding to each control value of each process station can be adjusted, in a systematic manner (e.g., from a minimum value to a maximum value), for every value (or a subset of values) at which a process station is capable of operating (i.e., the entire range of values that a process station is capable of operating at, not just limited to what will yield in-specification final outputs). Further, any number and any combination of setpoints can be adjusted for training purposes (step 205). The setpoints (or other control inputs) can be adjusted manually, by pre-programmed algorithms, or by predictive process control.

In some embodiments, one or more setpoints (or other control inputs) can be adjusted to values that will occur during known factory disruptions (e.g., wear and tear of a machine, insertion of a wrong component), unrelated to malware attacks, even if those values yield final outputs that are not in-specification.

In some embodiments, deep learning processor 118 can be implemented along with conventional standard process control systems associated with the operation and control of a factory process. Instead of using all the data associated with the operation and control of a factory process, deep learning processor 118 can train its machine learning algorithms using the same data that is provided to any standard process control system used in the operation and control of a factory process.

For each setpoint adjustment or set of setpoint adjustments (step 205), the manufacturing process can iterate through the process stations (step 210) for a predetermined time period, for a predetermined set of setpoint adjustments, and/or when a defined event occurs (e.g., a predefined amount of response data is collected), and provide setpoints (step 215) and generated response data 225 (e.g., station and control values (step 228), intermediate and final output values (step 227), data output (step 226), process values and manufacturing performance metrics (step 229) to deep learning processor 118. Deep learning processor 118 uses the different inputs received as the manufacturing process iterates through the process stations to condition its machine learning models.

Figure 3:
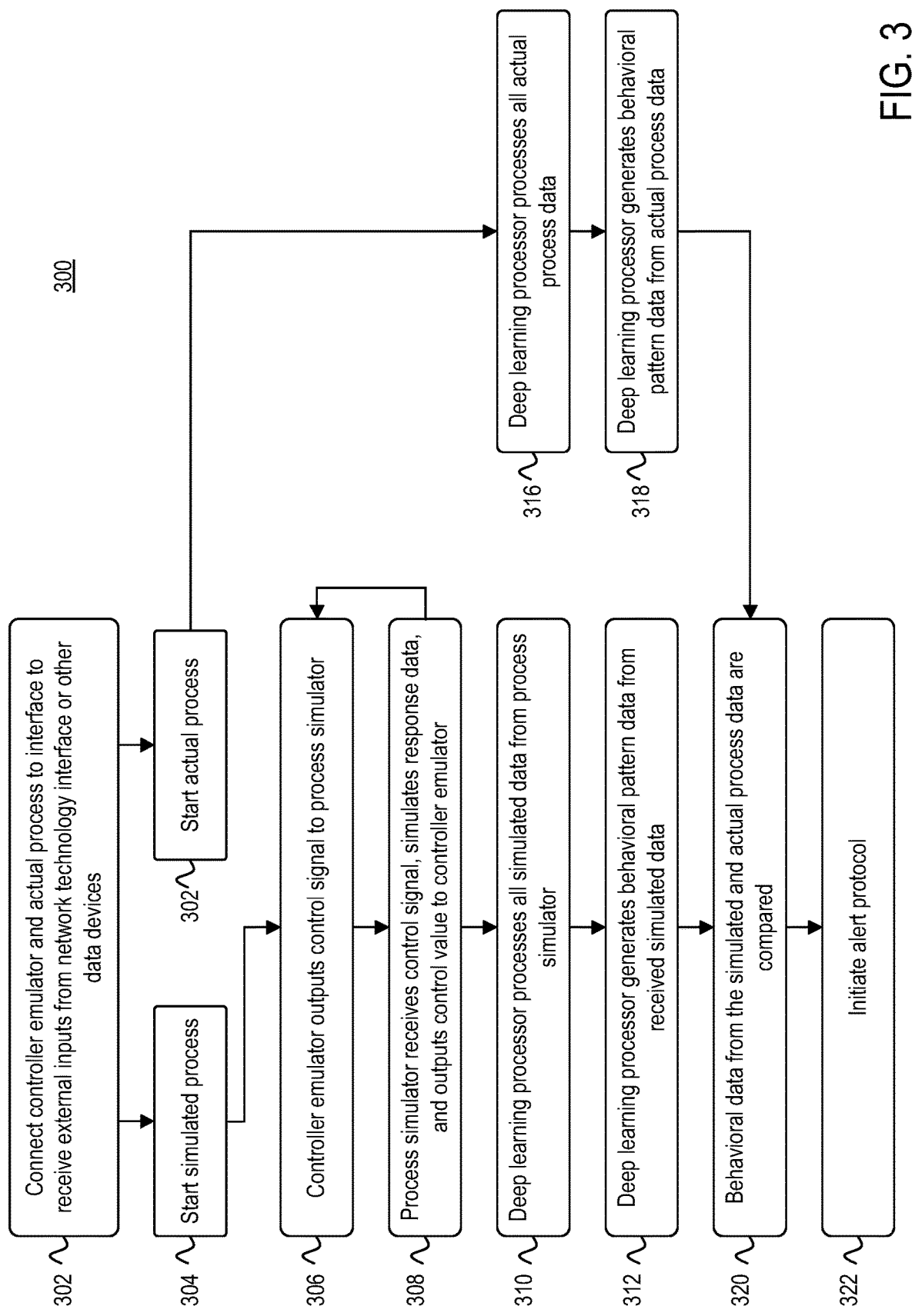
FIG. 3 is a flow diagram illustrating a method of detecting malware attacks, according to example embodiments.

After, method 200 has finished iterating through the process stations (e.g., after a predetermined time period, after a predetermined set of setpoint adjustments, and/or when a defined event occurs (e.g., a robust data set is generated)), then the conditioning of the machine learning models can be considered complete and a process simulator (step 244) can be created that can simulate response data that accurately reflects response data from a factory's production P/E/C systems. Using machine learning models to create a process simulator (e.g., process simulator 850) that is able to dynamically simulate production response data is more likely to fool sophisticated malware attacks that the intelligent honeypot is a factory production system and not a decoy Deep learning processor 118 with its conditioned machine learning models and process simulator can be deployed to an intelligent honeypot (step 241). An example intelligent honeypot is shown in FIG. 3. According to some embodiments, deep learning processor 118 is disconnected from any production system, can be scrubbed of any malware, and incorporated into an intelligent honeypot. In other embodiments, the intelligent honeypot has its own deep learning processor and only the conditioned machine learning models and created process simulator, scrubbed of any malware, are uploaded to the deep learning processor included in an intelligent honeypot.

FIG. 3 is a flow diagram illustrating a method 300 of detecting malware attacks, according to example embodiments. Method 300 may begin at step 302.

At step 302, controller emulator 850*a* and data processing server 800 may be connected to a network interface. Such connection may allow controller emulator 850*a* and data processing server 800 to receive external inputs from network technologies or other data services.

At step 304, a simulated process is initiated. For example, process simulator 850 may execute for a predetermined time or upon occurrence of an event.

At step 306, emulator 850*b* may output one or more control signals for process simulator 850*a*. In some embodiments, the one or more control signals may be generated based on inputs from network technologies or other data services.

At step 308, process simulator 850*a* may receive the one or more control signals from emulator 850*b*. Using the one or more control signals, simulator 850*a* may simulate response data, including control values. Simulator 850*a* may provide control values to emulator 850*b*. Process simulator 850*a* may provide the simulated response data to deep learning processor 118.

At step 310, deep learning processor 118 may employ its conditioned machine learning models to analyze the simulated response data from process simulator.

At step 312, deep learning processor 118 may generate expected behavioral pattern data based on the analyzing. For example, based on its understanding of factory operation and control data and such data's correlation to specific control signals, deep learning processor 118 can predict, for the received simulated response data, expected behavioral patterns.

In parallel to steps 302-312, manufacturing system 100 may perform steps 314-318.

At step 314, the actual process may be initiated. In some embodiments, initiating the actual process may include initializing setpoints for each process station (e.g., process station 122, 142) and providing those setpoints to deep learning processor 118. In some embodiments, as the manufacturing process iterates through the process stations, any control signal that is sent to the process stations, any control input that is provided to the station controllers, any adjusted setpoint are all provided to deep learning processor 118.

At step 316, deep learning processor 118 may process all the actual process data. For example, as provided above, deep learning processor 118 may process one or more of the setpoints, control signals, control inputs, adjust setpoints, and the like.

At step 318, deep learning processor 118 may generate actual behavioral pattern data based on the actual process data. Actual behavioral pattern data may refer to behavioral pattern data that is generated for the received response data, and is distinguished from expected behavioral pattern data, which is based on simulated response data.

At step 320, deep learning processor 118 may compare the expected behavioral pattern data to the actual behavioral pattern data. Such comparison may be performed to identify anomalous activity and malware attacks. In some embodiments, deep learning processor 118 may generate a confidence level for the anomalous activity and/or malware attacks. In some embodiments, the confidence level may be expressed as a numerical probability of accuracy for the prediction, in other aspects, the confidence level may be expressed as an interval or probability range.

At step 322, deep learning processor 118 may initiate an alert protocol. For example, deep learning processor may initiate the alert protocol based on the numerical probability of accuracy. Such numerical probability of accuracy may indicate that the anomalous activity is a malware attack.

In some embodiments, an operator or algorithm can assign thresholds to the confidence levels associated with anomalous activities, and can also determine the type of anomalous activity based on the confidence level generated. Based on the type of anomalous activity, one or more operations (referred to herein as "alert protocols") are run to address the anomalous activity. For example, for anomalous activities receiving a high confidence level score, an alert protocol can be initiated by deep learning processor 118, whereas with anomalous activities receiving lower confidence level scores, an operator can be prompted to review the anomalous activity before an alert protocol is initiated. In some embodiments, the alert protocol may be communicated to one or more of data processing server 800, process controller 120, and/or process controller 140. In some embodiments, the confidence levels can be divided into three intervals: high, medium and low, and a threshold can be assigned to each interval. Further, actions to be performed can be assigned to each interval. For example, for confidence levels that fall into the high confidence interval an alert protocol can be initiated, for confidence levels that fall into the medium confidence interval, an operator can be prompted to review the anomalous activity, for confidence levels that fall into the low confidence level interval, the anomalous activity can be flagged and sporadically checked. The thresholds and interval ranges can be reviewed and adjusted to minimize false positives or false negatives. In other embodiments, the confidence levels can be divided into two or more intervals.

In some embodiments, different alert protocols can be assigned to the different intervals. For example, if an anomalous activity has a confidence level that corresponds to a high interval, the alert protocol can trigger a strong action, like shutting down an associated factory's P/E/C systems that may be at risk or in some cases shutting down the intelligent honeypot. Whereas if the anomalous activity has a confidence level that corresponds to a lower interval, an alert protocol can trigger a more moderate action like generating a report, email or other notifications. In further embodiments, different alert protocols can be assigned to different types of anomalies detected that meet a predefined confidence level threshold. The alert protocol initiated can be a set of actions designed to compensate or correct for the type of anomalous activity detected. For example, deep learning processor 118 may provide new control instructions to data processing server 800 and/or process controller 120 and/or process controller 140 to compensate for the detected anomaly. In some embodiments, a process may not be able to be shut down or turned off without a strict shut down process. To account for this, in some embodiments, deep learning processor 118 may take control of the manufacturing process.

The alert protocol can be mechanical (e.g., signaling an alert by siren, flashing light or other indicator), digital (e.g., printing a report, emailing a supervisor, notifying a control panel), functional (e.g., stopping any or all of the process similar or controller emulator 850a, adjusting the settings of the process simulator 850b or controller emulator 850a), or any combination of the above. The alert protocol can be initiated by deep learning processor 118 and communicated to controller emulator 850a run the alert protocol. Functional protocols can be implemented by communication with controller emulator 850a (e.g., sending a control signals to process simulator 850). The protocol can be a digital activation of individual relays, controlled by TTL logic, ladder logic or other programmable commands communicated to external devices such as station controllers, PLCs or other. The protocol and command structure are incorporated into deep learning processor 118. Deep learning processor 118 can include programming to allow any of these. Input to the deep learning processor 118 can, in some embodiments, be performed, via manual input by keyboard entry. This helps maintain the integrity of deep learning processor 118. In further embodiments digital entry such as with a thumb drive or network connection can also be allowed.

Further, deep learning processor 118 can identify whether or not the anomalous activity is a malware attack, and a confidence level for its identification. For example, when behavioral pattern data indicates significant, sudden, rapid or unexpected changes in the response data that is different from the expected behavioral data. In one embodiment, deep learning processor 118 can analyze whether the behavioral pattern data is consistent with behavioral pattern data for known disruptive activity that is not a malware attack. In some embodiments deep learning processor 118 uses data output generated during the manufacturing process and/or data from a data logging module to determine whether the anomalous activity was caused by an attack or by some other failure (e.g., the material used was defective, a faulty component was installed)

An operator or algorithm can assign thresholds to the confidence levels associated with activities identified to be a malware attack and can predefine actions (referred to herein as "alert protocols") to be initiated when a threshold is met. For example, for detected malware attacks receiving a high confidence level score, an alert protocol can be initiated by deep learning processor 118 and communicated to the controller emulator to run the alert protocol, whereas with detected malware attacks receiving lower confidence level scores, an operator can be prompted to review the detected malware attack before an alert protocol is initiated. In one embodiment, the confidence levels can be divided into three intervals: high, medium and low, and a threshold can be assigned to each interval. In other embodiments, confidence levels can be divided into two or more intervals. Further, actions to be performed can be assigned to each interval. For example, for confidence levels that fall into the high confidence interval an alert protocol can be initiated, for confidence levels that fall into the medium confidence interval, an operator can be prompted to review the detected malware attack, for confidence levels that fall into the low confidence level interval, the detected malware attack can be flagged and sporadically checked. The thresholds and interval ranges can be reviewed and adjusted to minimize false positives or false negatives.

In some embodiments, different alert protocols can be assigned to the different intervals. For example, if the detected malware attack has a confidence level that corresponds to a high interval, the alert protocol can trigger a strong action, like shutting down an associated factory's P/E/C systems that may be at risk or in some cases the intelligent honeypot itself. Whereas if the detected malware attack has a confidence level that corresponds to a lower interval, an alert protocol can trigger a more moderate action like generating a report, email or other notifications that can identify the malware attack and suggest immediate corrective actions to counter the attack. In further embodiments, different alert protocols can be assigned to different types of types of malware attacks detected that meet a predefined confidence level threshold, and the proper alert protocol is initiated by deep learning processor 118 for the attack that is detected, when it exceeds a predefined confidence level. The alert protocol can be a set of actions designed to compensate or correct for the type of malware attack detected.

In some embodiments, deep learning processor 118 can be configured to communicate with existing IT security systems to notify the systems of the anomalous activity. In further embodiments, deep learning processor 118 can be configured to communicate with a data logging module. This communication can provide alerts specifying the exact source of the malware attack and also be used to reconfigure firewall and other IT infrastructure to better defend the factory processes and equipment. In some embodiments deep learning processor 118 can be configured to communicate with a computer system in a factory's production P/E/C systems to perform an alert protocol, to correct a vulnerability or anomaly, to deflect or counteract an identified malware attack and/or to shut down one or more of a factory's production P/E/C systems. For example, deep learning processor 118 may be configured to change various setpoints of process controller 120 and/or process controller 140 to compensate for the malware attack.

Figure 4:
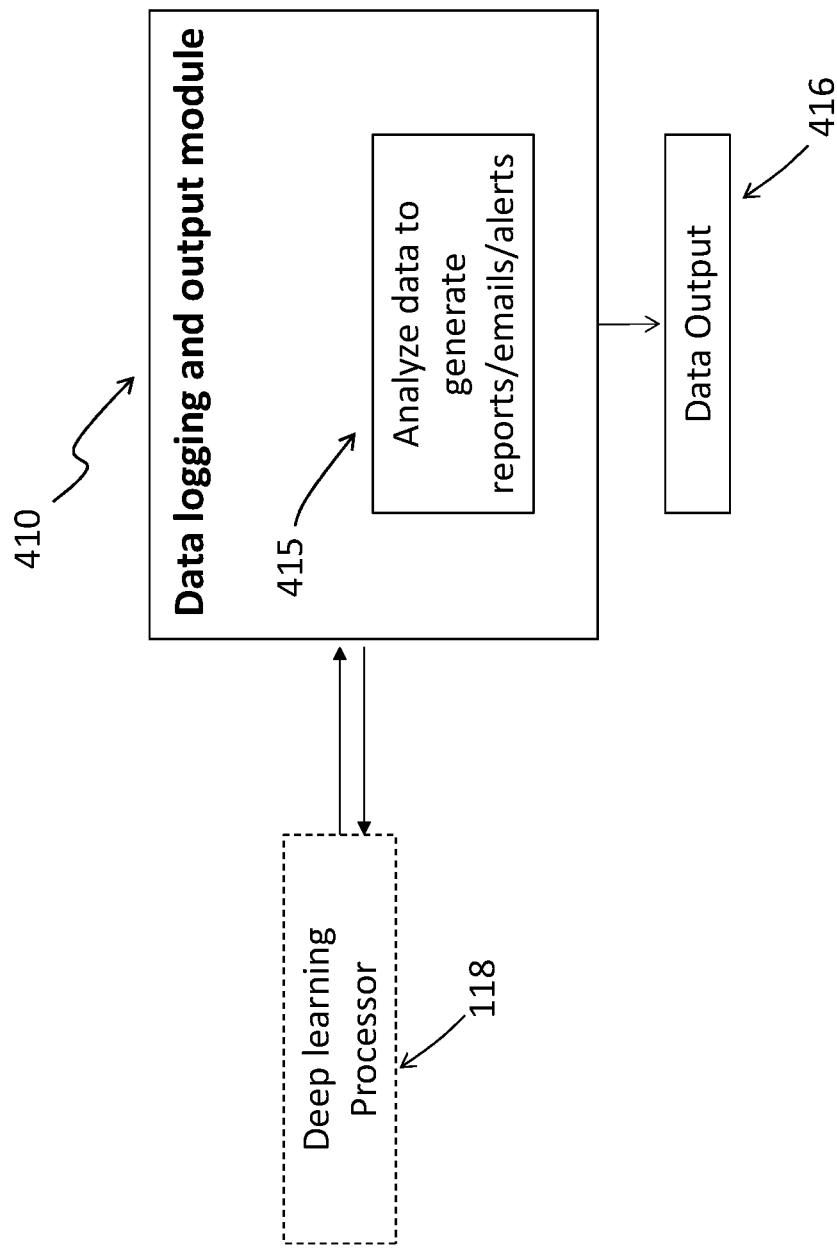
FIG. 4 illustrates an example data logging and output module, according to example embodiments.

FIG. 4 illustrates an example data logging and output module 410, according to example embodiments. Data logging and output module 410 may be configured to receive data from deep learning processor 118 and data processing server 800 to analyze the data and to generate reports, emails, alerts, log files or other data compilations (step 415). For example, data logging module 410 can be programmed to search the received data for predefined triggering events, and to generate reports, emails, alerts, log files, updates to a monitoring dashboard, or other data compilations showing relevant data associated with those triggering events (step 415). For example, identification of anomalous activity can be defined as a triggering event and the following data can be reported: behavioral pattern for the response data compared to the expected behavioral pattern, the station(s), controller(s) or sensor(s) that were impacted by the anomalous activity, the sensor(s) that generated the triggering event, identification of the specific response data that is unexpected, date and time of day that the anomalous activity occurred, the confidence level associated with the triggering event, the impact of the anomalous activity on other stations and the intermediate or final output. Other suitable triggers can be defined, and other suitable data can be reported. In some embodiments, data logging module 410 can be included within deep learning processor 118. In some embodiments, data from the data logging module can be provided to deep learning processor 118 as part of the response data.

Figure 5:
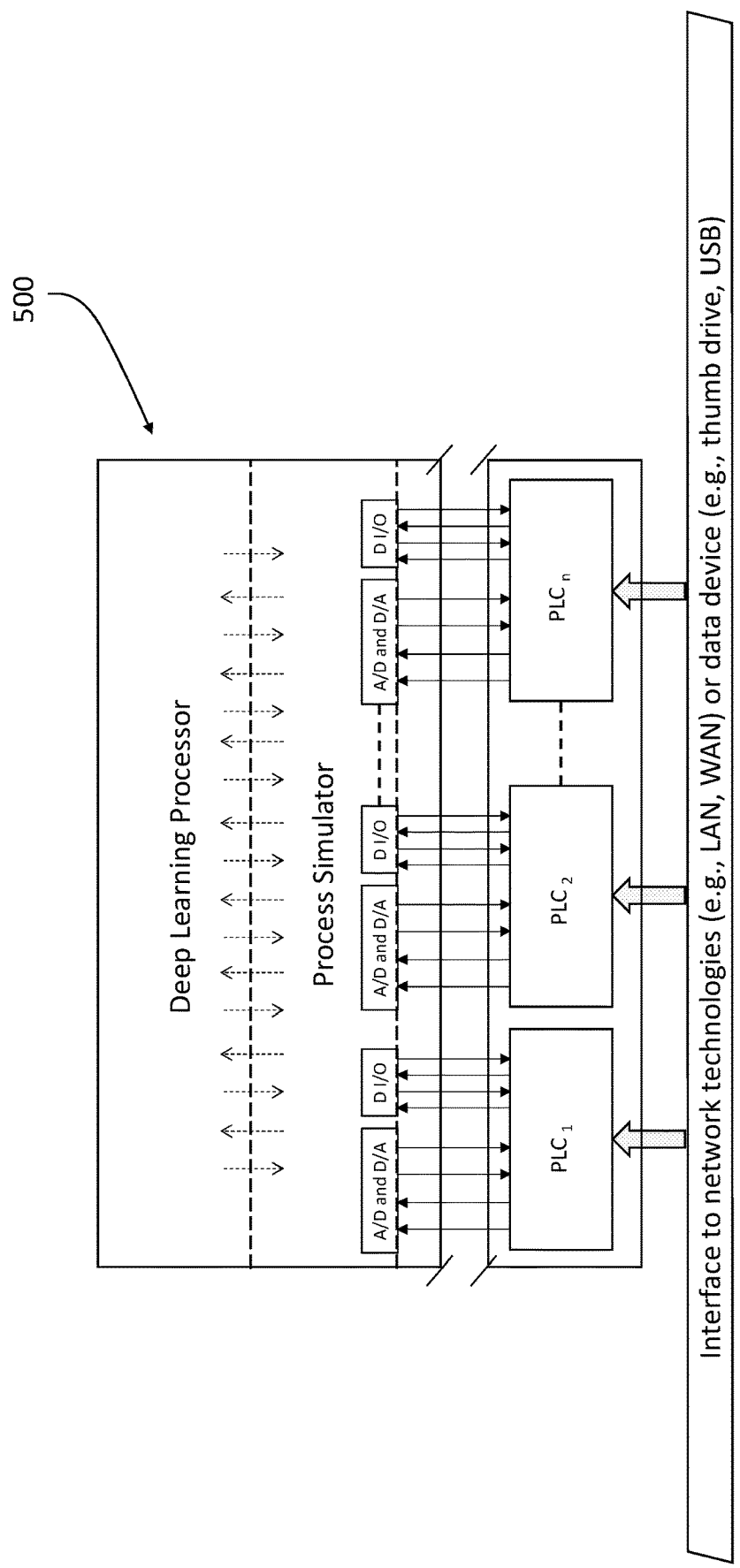
FIG. 5 is a block diagram illustrating a redundant PLC architecture, according to example embodiments.

FIG. 5 is a block diagram illustrating a redundant PLC architecture 500, according to example embodiments. As shown, architecture 500 may include an interface to network technologies or a device drive (reference numeral 502) in communication with a set of PLCs 504 (i.e., $PLC_1$, $PLC_2, \ldots, PLC_n$). Each PLC 504 may be in communication with process simulator 850.

Figure 6:
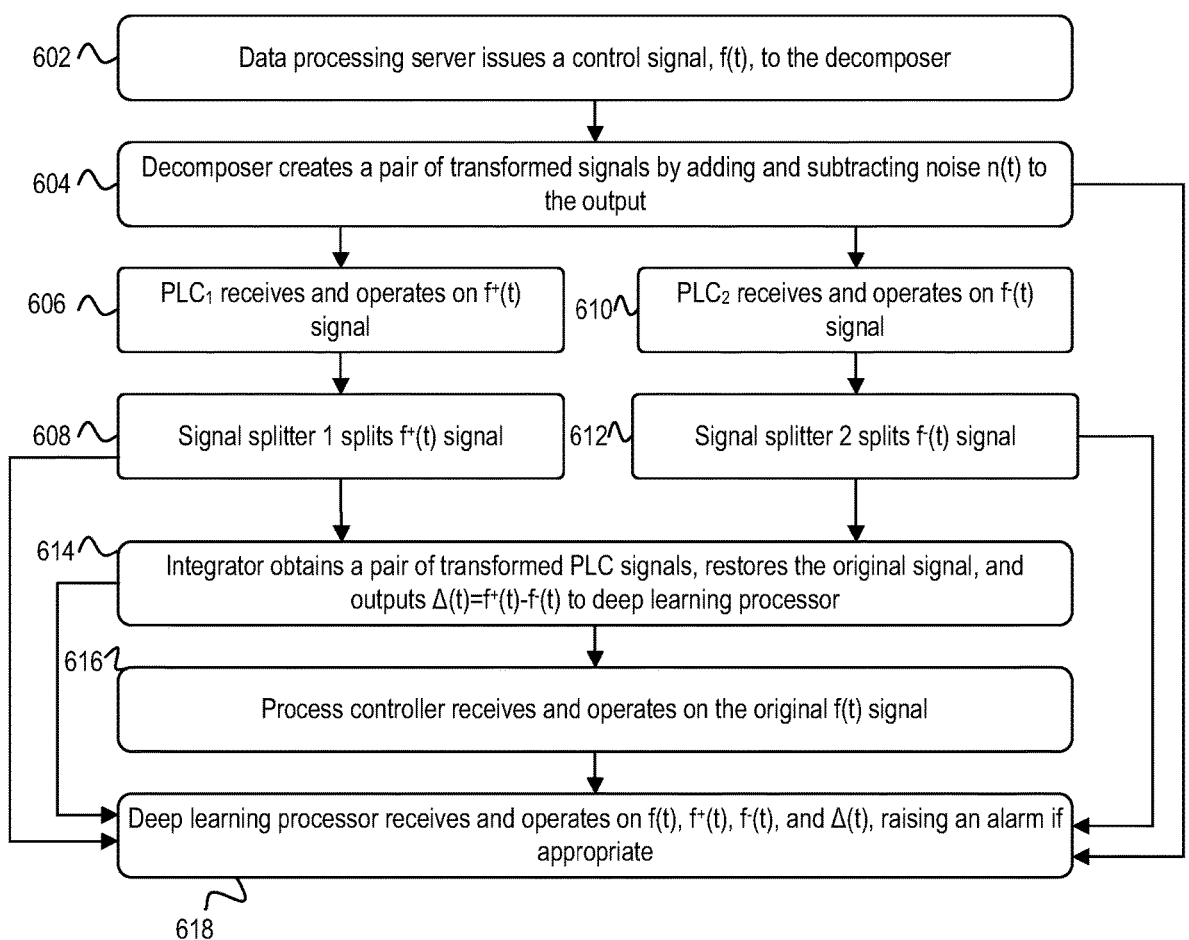
FIG. 6 is a flow diagram illustrating a method of detecting malware attacks, according to example embodiments

FIG. 6 is a flow diagram illustrating a method of detecting malware attacks, according to example embodiments. Method 600 may begin at step 602.

At step 602, data processing server 800 may issue a control signal, f (t), to the decomposer.

At step 604, the decomposer may create a pair of transformed signals by adding and subtracting noise, n(t), to the output. Mathematically, this may be represented as $f^+(t)=f(t)+n(t)$ and $f^-(t)=f(t)-n(t)$. Decomposer may provide $f^+(t)$ and $f^-(t)$ to a pair of PLCs. In some embodiments, decomposer may provide the original control signal, f(t), to deep learning processor 118. In some embodiments, n(t)=0. In some embodiments, n(t) >0. In some embodiments, n(t)<0.

At step 606, $PLC_1$ may receive an operate on the $f^+(t)$ signal. At step 608, a signal splitter may split the $f^+(t)$ signal.

Similarly, at step 610, $PLC_2$ may receive an operate on the $f^-(t)$ signal. At step 612, a second signal splitter may split the $f^-(t)$ signal.

At step 614, an integrator may obtain the pair of transformed PLC signals and restore each signal to the original signal. In some embodiments, integrator may restore the original signal by averaging the signals, thereby cancelling the respective noise terms. Mathematically, $f(t)=[f^+(t)+f^-(t)]/2$. In some embodiments, integrator ma further generate, as output for deep learning processor 118, $\Delta(t)=f^+(t)-f^-(t)$.

At step 614, a process controller may receive and operate on the original f(t) signal.

At step 618, deep learning processor 118 may receive an operator on one or more of f(t), $f^+(t)$, $f^-(t)$, and $\Delta(t)$. Deep learning processor 118 may raise an alarm if appropriate.

Figure 7:
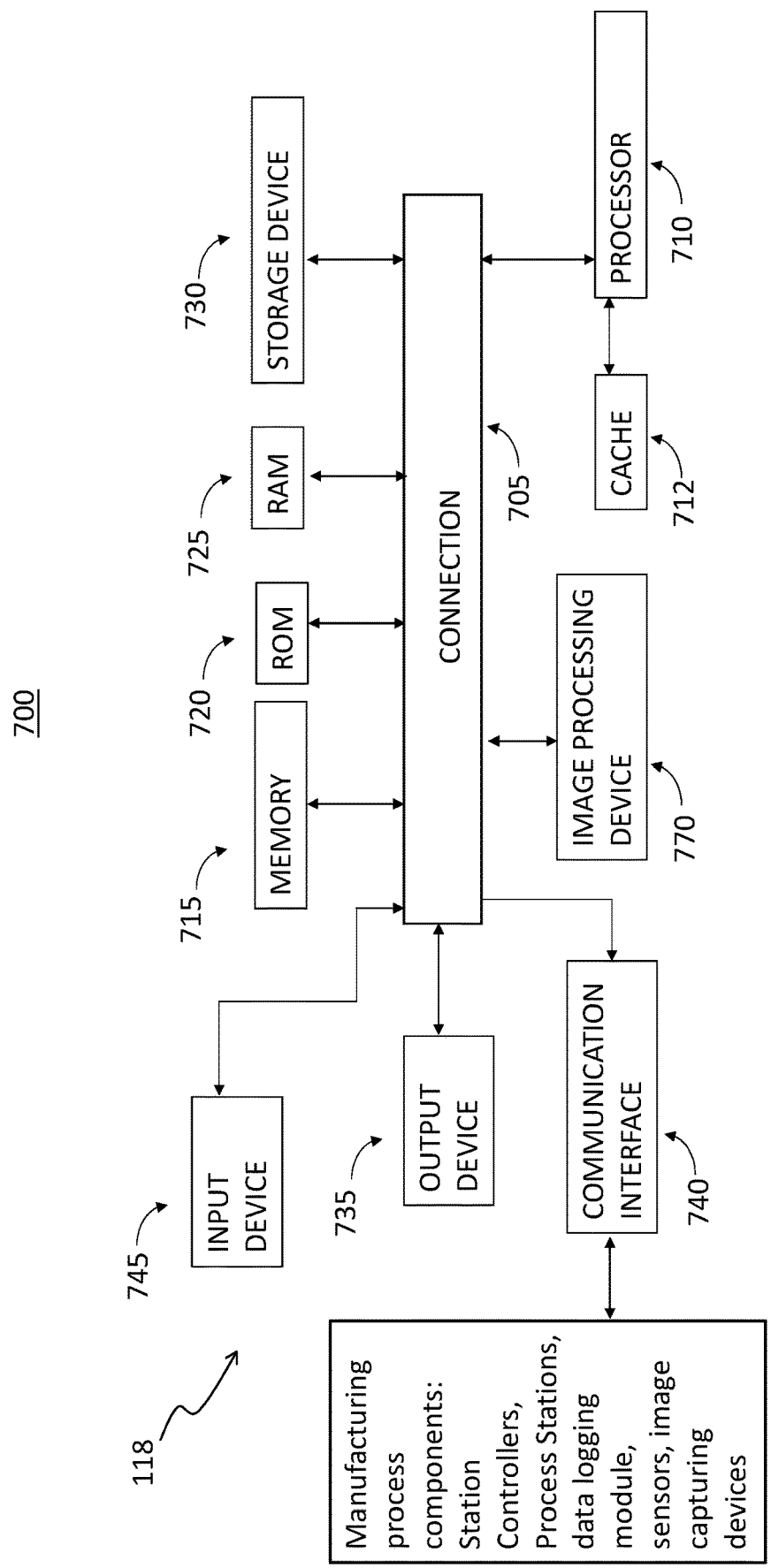
FIG. 7 is a block diagram illustrating a computing system architecture, according to example embodiments.

FIG. 7 is a block diagram illustrating a computing system architecture 700, according to example embodiments. In some embodiments, computing system architecture 700 may be representative of deep learning processor 118.

As shown, computing system architecture 700 can include a processing unit (e.g., CPU/s and/or processor/s) 710 and bus 705 that couples various system components including system memory 715, such as read only memory (ROM) 720 and random access memory (RAM) 725, to processing unit 710. Processing unit 710 can include one or more processors. In some embodiments, the processing unit 710 can be specially designed hardware for controlling the operations of deep learning processor 118 and performing predictive process control. When various machine learning algorithms and computations described herein.

Memory 715 can include various memory types with different performance. characteristics, such as memory cache 712. Processor 710 can be coupled to storage device 730, which can be configured to store software and instructions necessary for implementing one or more functional modules and/or database systems. Each of these modules and/or database systems can be configured to control processor 710 as well as a special-purpose processor where software instructions are incorporated into the actual processor design.

To enable operator interaction with deep the learning processor, input device 745 can represent any number of input mechanisms, such as a microphone for speech, a touch-sensitive screen for gesture or graphical input, keyboard, mouse, motion input and so forth. An output device 735 can also be one or more of a number of output mechanisms (e.g., printer, monitor) known to those of skill in the art. In some instances, multimodal systems can enable an operator to provide multiple types of input to communicate with the deep learning processor. Communications interface 740 can generally govern and manage the operator input and system output, as well as all electronic input received from and sent to other components that are part of a manufacturing process such as the station controllers, process stations, data logging module, and all associated sensors and image capturing devices. There is no restriction on operating on any particular hardware arrangement and therefore the basic features here may easily be substituted for improved hardware or firmware arrangements as they are developed. Data output from deep learning processor can be displayed visually, printed, or generated in file form and stored in storage device 730 or transmitted to other components for further processing.

Communication interface 740 can be provided as interface cards (sometimes referred to as "line cards"). Generally, they control the sending and receiving of data packets over the network and sometimes support other peripherals used with the router. Among the interfaces that can be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow processing unit 710 to efficiently perform machine learning and other computations necessary to implement predictive process control. Communication interface 740 can be configured to communicate with the other components that are part of a manufacturing process such as the station controllers, process stations, data logging module, and all associated sensors and image capturing devices.

In some embodiments, the deep learning processor can include an imaging processing device 770 that processes images received by various image capturing devices such as video cameras, that are coupled one or more processing station and are capable of monitoring and capturing images of intermediate and final outputs. These images can be transmitted to the deep learning processor via communication interface 740, and processed by image processing device 770. The images can be processed to provide data, such as number and type of defects, output dimensions, throughput, that can be used by the deep learning processor to compute intermediate and final output values. In some embodiments, the image processing device can be external to deep learning processor and provide information to deep learning processor via communication interface 740.

Storage device 730 is a non-transitory memory and can be a hard disk or other types of computer readable media that can store data accessible by a computer, such as magnetic cassettes, flash memory cards, solid state memory devices, digital versatile disks, cartridges, random access memories (RAMs) 725, read only memory (ROM) 720, and hybrids thereof.

In practice, storage device 730 can be configured to receive, store and update input data to and output data from the deep learning processor, for example functional priors, experiential priors, universal input; pre-process inputs; in-process inputs and post-process inputs.

In some embodiments, deep learning processor 118 can include the same components shown in FIG. 7 for deep learning processor 118, except the communication interface is coupled to an interface that allows the intelligent honeypot (via the process controller or the controller emulators) to connect with network technologies e.g., local area network (LAN), a wide area network (WAN), the Internet, Bluetooth technologies, Nearfield communication technologies, Secure RF technologies, and/or any other suitable communication technologies, or data device (e.g., thumb drive, flash drive, USB drive) to receive inputs. The interface can expose the intelligent honeypot to a malware attack. Further, the communications interface is not coupled to any in production manufacturing process components.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, etc.), non-transitory optical media (such as compact discs, digital video discs, Blu-ray discs, etc.), non-transitory semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

The various systems, methods, and computer readable media described herein can be implemented as part of a cloud network environment. As used herein, a cloud-based computing system is a system that provides virtualized computing resources, software and/or information to client devices. The computing resources, software and/or information can be virtualized by maintaining centralized services and resources that the edge devices can access over a communication interface, such as a network. The cloud can provide various cloud computing services via cloud elements, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. A person of ordinary skill in the art would understand that the term mechanism can encompass hardware, software, firmware, or any suitable combination thereof.

Unless specifically stated otherwise as apparent from the above discussion, it is appreciated that throughout the description, discussions utilizing terms such as "determining," "providing," "identifying," "comparing" or the like, refer to the action and processes of a computer system, or similar electronic computing device, that manipulates and transforms data represented as physical (electronic) quantities within the computer system memories or registers or other such information storage, transmission or display devices. Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps and system-related actions. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system can practice all or part of the recited methods, can be a part of the recited systems, and/or can operate according to instructions in the recited non-transitory computer-readable storage media. Such logical operations can be implemented as modules configured to control the processor to perform particular functions according to the programming of the module.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. The apparatus, method and system for intelligently emulating factory control systems and simulating response data have been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A method of detecting unexpected activity in a manufacturing environment, comprising:
   simulating, by a computing system, response data for a manufacturing process executing within a manufacturing system based on a control signal;
   generating, by a deep learning processor of the computing system, expected behavioral pattern data based on the simulated response data;
   receiving, by the computing system, actual response data for the manufacturing process executing within the manufacturing system;
   generating, by the deep learning processor of the computing system, actual behavioral pattern data based on actual process data;
   comparing, by the deep learning processor, the expected behavioral pattern data to the actual behavioral pattern data;
   based on the comparing, generating, by the deep learning processor, a confidence level that represents a confidence that unexpected activity is present in the manufacturing system; and
   initiating, by the computing system, one or more remedial actions in accordance with the confidence level associated with the unexpected activity.

2. The method of claim 1, further comprising:
   generating, by the computing system, an emulated control signal for the manufacturing process using an emulator, wherein the control signal used by the computing system to generate the response data is the emulated control signal.

3. The method of claim 1, wherein initiating, by the computing system, the one or more remedial actions in accordance with the confidence level associated with the unexpected activity comprises:
   determining that the confidence level associated with the unexpected activity exceeds a threshold level of confidence that the unexpected activity exists; and
   based on the determining, issuing an alert protocol to signal existence of the unexpected activity.

4. The method of claim 1, wherein initiating, by the computing system, the one or more remedial actions in accordance with the confidence level associated with the unexpected activity comprises:
   determining that the confidence level associated with the unexpected activity exceeds a threshold level of confidence that the unexpected activity exists; and
   based on the determining, prompting a human operator to review the unexpected activity.

5. The method of claim 1, wherein generating, by the deep learning processor, the confidence level that represents the confidence that the unexpected activity is present in the manufacturing system comprises:
   predicting, by the deep learning processor, that the unexpected activity is present in the manufacturing system based on the comparing; and
   generating a numerical probability that represents an accuracy of the predicting.

6. The method of claim 1, wherein initiating, by the computing system, the one or more remedial actions in accordance with the confidence level associated with the unexpected activity comprises:
   determining that the confidence level associated with the unexpected activity exceeds a threshold level of confidence that the unexpected activity exists; and
   based on the determining, causing the manufacturing system to shut down.

7. The method of claim 1, wherein the one or more remedial actions comprises one or more of a mechanical action, a digital action, or a functional action.

8. A non-transitory computer readable medium comprising one or more sequences of instructions, which, when executed by a processor, causes a computing system to perform operations comprising:
   simulating, by the computing system, response data for a manufacturing process executing within a manufacturing system based on a control signal;
   generating, by a deep learning processor of the computing system, expected behavioral pattern data based on the simulated response data;
   receiving, by the computing system, actual response data for the manufacturing process executing within the manufacturing system;
   generating, by the deep learning processor of the computing system, actual behavioral pattern data based on actual process data;
   comparing, by the deep learning processor, the expected behavioral pattern data to the actual behavioral pattern data;
   based on the comparing, generating, by the deep learning processor, a confidence level that represents a confidence that unexpected activity is present in the manufacturing system; and
   initiating, by the computing system, one or more remedial actions in accordance with the confidence level associated with the unexpected activity.

9. The non-transitory computer readable medium of claim 8, further comprising:
   generating, by the computing system, an emulated control signal for the manufacturing process using an emulator, wherein the control signal used by the computing system to generate the response data is the emulated control signal.

10. The non-transitory computer readable medium of claim 8, wherein initiating, by the computing system, the one or more remedial actions in accordance with the confidence level associated with the unexpected activity comprises:

determining that the confidence level associated with the unexpected activity exceeds a threshold level of confidence that the unexpected activity exists; and based on the determining, issuing an alert protocol to signal existence of the unexpected activity.

11. The non-transitory computer readable medium of claim 8, wherein initiating, by the computing system, the one or more remedial actions in accordance with the confidence level associated with the unexpected activity comprises:

determining that the confidence level associated with the unexpected activity exceeds a threshold level of confidence that the unexpected activity exists; and based on the determining, prompting a human operator to review the unexpected activity.

12. The non-transitory computer readable medium of claim 8, wherein generating, by the deep learning processor, the confidence level that represents the confidence that the unexpected activity is present in the manufacturing system comprises:

predicting, by the deep learning processor, that the unexpected activity is present in the manufacturing system based on the comparing; and generating a numerical probability that represents an accuracy of the predicting.

13. The non-transitory computer readable medium of claim 8, wherein initiating, by the computing system, the one or more remedial actions in accordance with the confidence level associated with the unexpected activity comprises:

determining that the confidence level associated with the unexpected activity exceeds a threshold level of confidence that the unexpected activity exists; and based on the determining, causing the manufacturing system to shut down.

14. The non-transitory computer readable medium of claim 8, wherein the one or more remedial actions comprises one or more of a mechanical action, a digital action, or a functional action.

15. A system comprising:

a processor; and a memory having one or more programming instructions stored thereon, which, when executed by the processor, causes the system to perform operations comprising:

simulating response data for a manufacturing process executing within a manufacturing system based on a control signal;

generating, by a deep learning processor, expected behavioral pattern data based on the simulated response data;

receiving actual response data for the manufacturing process executing within the manufacturing system;

generating, by the deep learning processor, actual behavioral pattern data based on actual process data;

comparing, by the deep learning processor, the expected behavioral pattern data to the actual behavioral pattern data;

based on the comparing, generating, by the deep learning processor, a confidence level that represents a confidence that unexpected activity is present in the manufacturing system; and initiating one or more remedial actions in accordance with the confidence level associated with the unexpected activity.

16. The system of claim 15, further comprising:

generating an emulated control signal for the manufacturing process using an emulator, wherein the control signal used to generate the response data is the emulated control signal.

17. The system of claim 15, wherein initiating the one or more remedial actions in accordance with the confidence level associated with the unexpected activity comprises:

determining that the confidence level associated with the unexpected activity exceeds a threshold level of confidence that the unexpected activity exists; and based on the determining, issuing an alert protocol to signal existence of the unexpected activity.

18. The system of claim 15, wherein initiating the one or more remedial actions in accordance with the confidence level associated with the unexpected activity comprises:

determining that the confidence level associated with the unexpected activity exceeds a threshold level of confidence that the unexpected activity exists; and based on the determining, prompting a human operator to review the unexpected activity.

19. The system of claim 15, wherein generating, by the deep learning processor, the confidence level that represents the confidence that the unexpected activity is present in the manufacturing system comprises:

predicting, by the deep learning processor, that the unexpected activity is present in the manufacturing system based on the comparing; and generating a numerical probability that represents an accuracy of the predicting.

20. The system of claim 15, wherein initiating the one or more remedial actions in accordance with the confidence level associated with the unexpected activity comprises:

determining that the confidence level associated with the unexpected activity exceeds a threshold level of confidence that the unexpected activity exists; and based on the determining, causing the manufacturing system to shut down.

* * * * *